US008665867B2

(12) United States Patent
Wu et al.

(10) Patent No.: US 8,665,867 B2
(45) Date of Patent: Mar. 4, 2014

(54) METHOD AND DEVICE FOR PROCESSING SWITCHING CONTROL COMMAND

(75) Inventors: Qing Wu, Guangdong Province (CN);
Xiuguo Wang, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 142 days.

(21) Appl. No.: 13/375,663

(22) PCT Filed: May 17, 2010

(86) PCT No.: PCT/CN2010/072856
§ 371 (c)(1),
(2), (4) Date: Dec. 6, 2011

(87) PCT Pub. No.: WO2010/139235
PCT Pub. Date: Dec. 9, 2010

(65) Prior Publication Data
US 2012/0069841 A1    Mar. 22, 2012

(30) Foreign Application Priority Data

Jun. 1, 2009    (CN) .......................... 2009 1 0142156

(51) Int. Cl.
*H04L 12/50*    (2006.01)
(52) U.S. Cl.
USPC ................................. 370/360; 398/5; 398/12
(58) Field of Classification Search
USPC .......................................... 370/360; 398/5, 12
See application file for complete search history.

(56) References Cited

U.S. PATENT DOCUMENTS

| 4,020,290 A | * | 4/1977 | Perna et al. ................... 370/381 |
| 5,673,307 A |   | 9/1997 | Holland et al. |
| 6,052,722 A | * | 4/2000 | Taghadoss ..................... 709/223 |
| 7,936,990 B2 | * | 5/2011 | Yan et al. ............................ 398/5 |
| 2005/0088963 A1 | * | 4/2005 | Phelps et al. ................... 370/216 |
| 2012/0294603 A1 | * | 11/2012 | Fu et al. ............................. 398/1 |

FOREIGN PATENT DOCUMENTS

| CN | 1404339 A | 3/2003 |
| CN | 1874201 A | 12/2006 |
| CN | 101577845 A | 11/2009 |

OTHER PUBLICATIONS

International Search Report for PCT/CN2010/072856 dated Sep. 2, 2010.

* cited by examiner

*Primary Examiner* — Anh-Vu Ly
*Assistant Examiner* — Hashim Bhatti
(74) *Attorney, Agent, or Firm* — Banner & Witcoff, Ltd.

(57) ABSTRACT

The present invention provides a method for processing a switch control command for solving the problem that consistency of data of the network device and the network management is unable to be kept in the process of processing the switch control command in the prior art. This method includes: when a priority of obtained trigger information is higher than a priority of a switch control command, discarding the switch control command (103); and reporting the discarded switch control command to a control system which manages the network device (104). The present invention further provides an device for processing a switch control command.

6 Claims, 5 Drawing Sheets

METHOD AND DEVICE FOR PROCESSING SWITCHING CONTROL COMMAND

TECHNICAL FIELD

The present invention relates to the optical network technical field, and in particularly, to a method and apparatus for processing a switch control command.

BACKGROUND OF THE RELATED ART

In the current optical fiber transmission networks, Automatic Protection Switching (APS) has become an important means in a network self-healing system. APS protocols of the optical fiber transmission networks, such as an APS protocol of a Synchronous Digital Hierarchy (SDH) and an APS protocol of an Optical Transport Network (OTN), are in the process of the continuous development and improvement.

In the APS protocol of the OTN, the description related to the receiving and maintaining of a switch control command includes: if one new switch control command is accepted, any switch control command with a lower priority preceding it will be discarded. If one switch control command with a higher priority covers alert information with a lower priority or an APS request in bidirectional switching, and other requests, such as the APS request in the bidirectional switching still exists when this switch control command with the higher priority is cleared, then this APS request will be reset to be valid. If one switch control command is covered by alert information or an APS request in the bidirectional switching, this switch control command will be discarded.

The above APS protocol only defines how to determine whether the switch control command is maintained or discarded after a network device receives the switch control command. It does not describe how to inform a user of the information regarding the discarding. However, in the practical operation process of the network device, the switch control command is often sent by a network manager. When other requests with higher priorities occur on the network device, for example a remote APS request is received in the bidirectional switching, and when the priority of this APS request is higher than that of the switch control command sent by the network manager, the switch control command on the network device will not be valid any more and will be discarded. However, the network manager usually is unable to know various trigger information of the protocol in real-time, and doesn't care about priority relationship of various information either. The data consistency between the network device and the network manager is unable to be maintained after the network device discards the switch control command. The solution often used at present is that the user manually performs a query and the network device feeds back the current state of the switch control command to the network manager.

In networks, such as the Ethernet (ETH), the Transport Multi Protocol Label Switching (TMPLS) network, etc., problems similar to those in the above optical network also exist.

SUMMARY OF THE INVENTION

Embodiments of the present invention provide a method and apparatus for processing a switch control command so as to solve a problem that data consistency between a network device and a network manager can not be maintained in a process of processing the switch control command in the prior art.

An embodiment of the present invention provides a method for processing a switch control command comprising:

discarding a switch control command when a priority of obtained trigger information is higher than that of the switch control command; and reporting the discarded switch control command to a control system which manages a network device.

An embodiment of the present invention provides a apparatus for processing a switch control command comprising:

an obtaining unit configured to obtain trigger information;

a comparing unit configured to compare a priority of the obtained trigger information with that of a switch control command;

a discarding unit configured to discard the switch control command;

a reporting unit configured to report the discarded switch control command to a control system which manages a network device.

The method for processing the switch control command in accordance with the embodiment of the present invention comprises discarding the switch control command when the priority of the obtained trigger information is higher than that of the switch control command and reporting the discarded switch control command to the control system which manages the network device. The present invention further discloses the apparatus for processing the switch control command so as to report the switch control command required to be discarded which is set on a network device to the control system which manages the network device. Hereby, the control system can automatically delete corresponding commands existing in a network device interface, while a user needs not to manually perform a query on the network device, thereby enhancing the data consistency between the network device and the control system which manages the network device.

PREFERRED EMBODIMENTS OF THE PRESENT INVENTION

An embodiment of the present invention provides a method for processing a switch control command, which is applied to networks, such as an optical network, Ethernet, TMPLS network, etc. The APS protocol of the optical network has defined priorities various trigger information. Thus, the priority of the obtained trigger information may be compared with that of the switch control command. It is determined, based on the comparison result, whether the switch control command is discarded, and the discarded switch control command is reported to a control system which manages a network device. Taking the optical network as an example, the essence of a technical scheme of the present invention will be described hereinafter and those skilled in the art should understand that the technical scheme of the present invention is also suitable for networks having automatic protection switching requirement, such as the Ethernet, the TMPLS network, etc.

Figure 1:
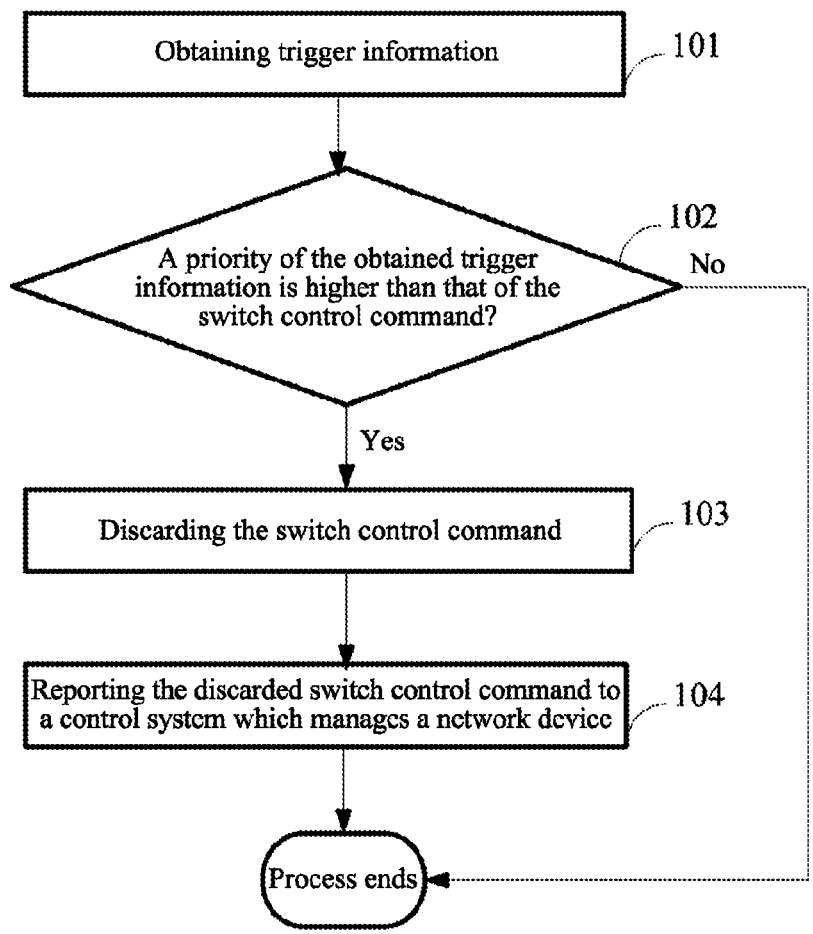
FIG. 1 is a flow chart of a method for processing a switch control command according to an embodiment of the present invention.

Referring to FIG. 1, a process of processing a switch control command comprises the following steps.

Step 101: trigger information is obtained.

Herein the trigger information may be alert information generated by a network device, or it may be remote APS information received by the network device in bidirectional switching, or it may be a switch control command sent by a network manager.

Step 102: a priority of the obtained trigger information is compared with that of the switch control command. When the priority of the obtained trigger information is higher than that of the switch control command, step 103 is performed; otherwise, the process ends.

Step 103: the switch control command is discarded.

Herein, when the obtained trigger information is the obtained alert information, the switch control command is stored into a reporting buffer, and a unit and protection state value that the switch control command indicates is cleared.

When the obtained trigger information is the received remote APS information, the legality of the received remote APS information is verified. When the received remote APS information is legal, the switch control command is stored into the reporting buffer, and the unit and protection state value that the switch control command indicates is cleared.

When the obtained trigger information is the sent switch control command, the switch control command is stored in the reporting buffer, and the unit and protection state value that the switch control command indicates are reset based on the sent switch control command.

Step 104: the discarded switch control command is reported to a control system which manages the network device.

Herein, whether there is the switch control command in the reporting buffer may be queried periodically. When there is the switch control command in the reporting buffer, discarding information of the switch control command is packed and the information is reported to the control system which manages the network device via a communication interface. The control system which manages the network device may be a network manager or a control unit.

Of course, in the above step 103, the unit and protection state value that the switch control command indicates can only be cleared or reset, thus in step 104, the switch control command with a lower priority may be directly reported to the control system which manages the network device based on the comparison result of the step 102. That is, in the embodiment of the present invention, when the priority of the obtained trigger information is higher than that of the switch control command, the unit and protection state value that the switch control command indicates can be deleted or reset, and the switch control command is directly reported to the control system which manages the network device.

The embodiments of the present invention will be described in further detail in conjunction with the accompanying figures.

Figure 2:
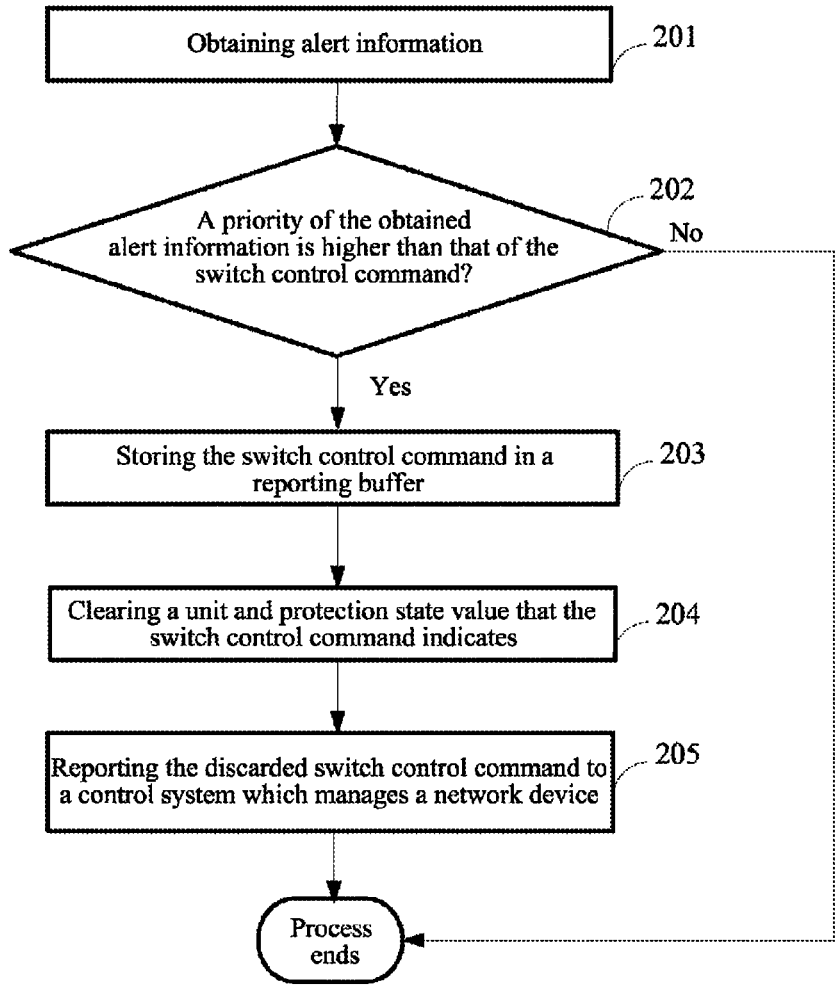
FIG. 2 is a flow chart of a method for processing a switch control command according to the first embodiment of the present invention.

In the first embodiment, trigger information is alert information generated by a network device. The network device stores priorities of various trigger information defined by the APS protocol, and some of storage units act as reporting buffers. Referring to FIG. 2, a particular process of processing a switch control command is shown and comprises the following steps.

Step 201: the alert information is obtained. Herein the alert information may be one of Signal Degraded (SD) and Signal Failure (SF).

Step 202: a priority of the obtained alert information is compared with that of the switch control command. When the priority of the obtained alert information is higher than that of the switch control command, step 203 is performed; otherwise, the process ends.

Herein when the alert information is the SD and the switch control command is Manual Switch (MS) or exercise (EXER), the priority of the SD may be known to be higher than that of the MS or EXER based on the priorities of various trigger information defined by the APS protocol, and step 203 is performed.

When the alert information is the SF, and the switch control command is MS or EXER, the priority of the SF may be known to be higher than that of the MS or EXER based on the priorities of various trigger information defined by the APS protocol, and step 203 is performed. Or when the alert information is the SF, a corresponding channel of which is a protection channel, and the switch control command is Forced Switch (FS), the step 203 is also performed.

Step 203: the switch control command is stored in the reporting buffer. That is, the MS, EXER or FS are stored into the reporting buffer.

Step 204: a unit and protection state value that the switch control command indicates is cleared. A unit and protection state value of the MS, EXER or FS is cleared.

Step 205: contents in the reporting buffer are reported to a control system which manages the network device.

Figure 3:
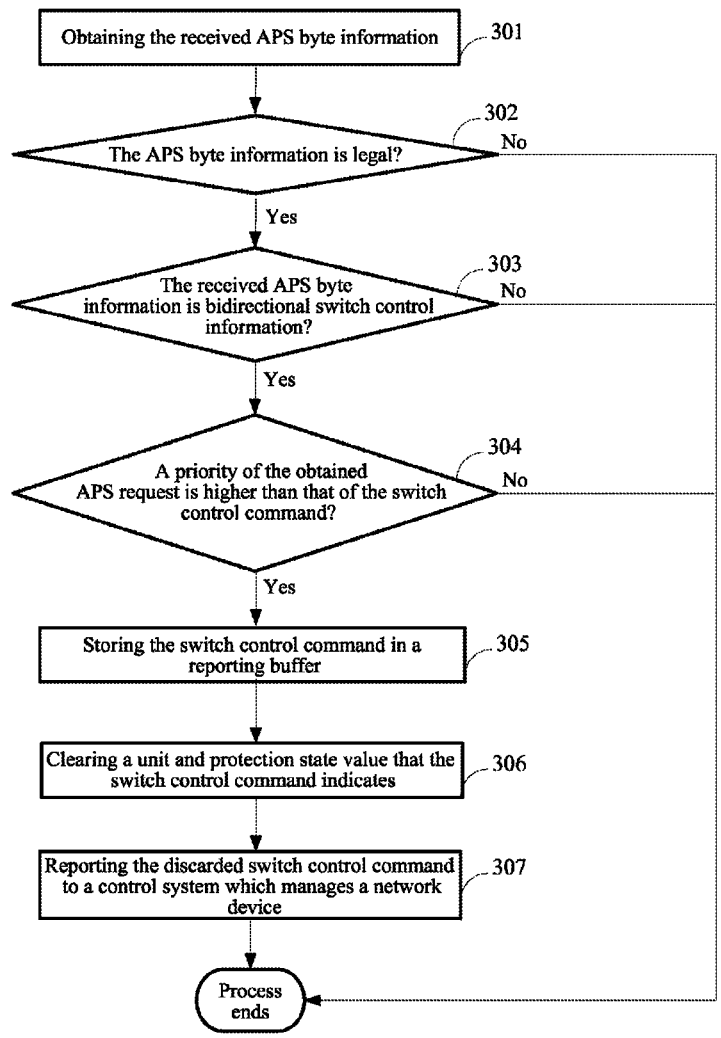
FIG. 3 is a flow chart of a method for processing a switch control command according to the second embodiment of the present invention.

In the second embodiment, trigger information is APS information sent by a remote node and received by a network device in the bidirectional switching. Particularly, the APS information is APS byte information. The network device stores priorities of various trigger information defined by the APS protocol, and some of storage units act as reporting buffers. Referring to FIG. 3, a particular process of processing a switch control command is shown and comprises the following steps.

Step 301: the received APS byte information is obtained.

The APS byte information may contain various APS requests, which represent switching request states of a remote node and may be switch control commands, such as EXER, MS, FS, or Locking (LO).

Step 302: the legality of the APS byte information is verified. If the APS byte information is legal, step 303 is performed, otherwise, the process ends. Herein, it is verified by taking a value from the APS byte information, as defined in the APS protocol. Verification rules are different according to different protection types. When the APS byte information is legal, step 303 is performed, otherwise, the process ends.

Step 303: it is determined whether the received APS byte information is bidirectional switching control information, and if yes, step 304 is performed, otherwise, the process ends. The received APS byte information is required to be processed only when the protection type of the APS byte information is bidirectional switching. Therefore, if the received APS byte information represents the bidirectional switching control information, then it is shown that the remote node is also the bidirectional switching control, and step 304 is performed, otherwise, the process ends.

Step 304: a priority of the APS request in the received APS byte information is compared with that of the switch control command. When the priority of the received APS request is higher than that of the switch control command, step 305 is performed; otherwise, the process ends.

Herein, when the switch control command is the EXER, step 305 is performed if the priority of the received APS request is higher than that of the EXER.

When the switch control command is the MS, step 305 is performed if the priority of the received APS request is higher than that of the MS, or the received APS request is the MS and the serial number of the requested signal of the MS is less than that of a signal of a channel where the switch control command MS is located.

When the switch control command is the FS, step 305 is performed if the received APS request is the LO, or the protection FS, or the protection FS and the serial number of the requested signal of the FS is less than that of a signal of a channel where the command FS is located.

Step 305: the switch control command is stored in the reporting buffer. That is, the MS, EXER or FS are stored in the reporting buffer.

Step 306: a unit and protection state value that the switch control command indicates is cleared. The unit and protection state value of the MS, EXER or FS is cleared.

Step 307: contents in the reporting buffer are reported to a control system which manages the network device.

Figure 4:
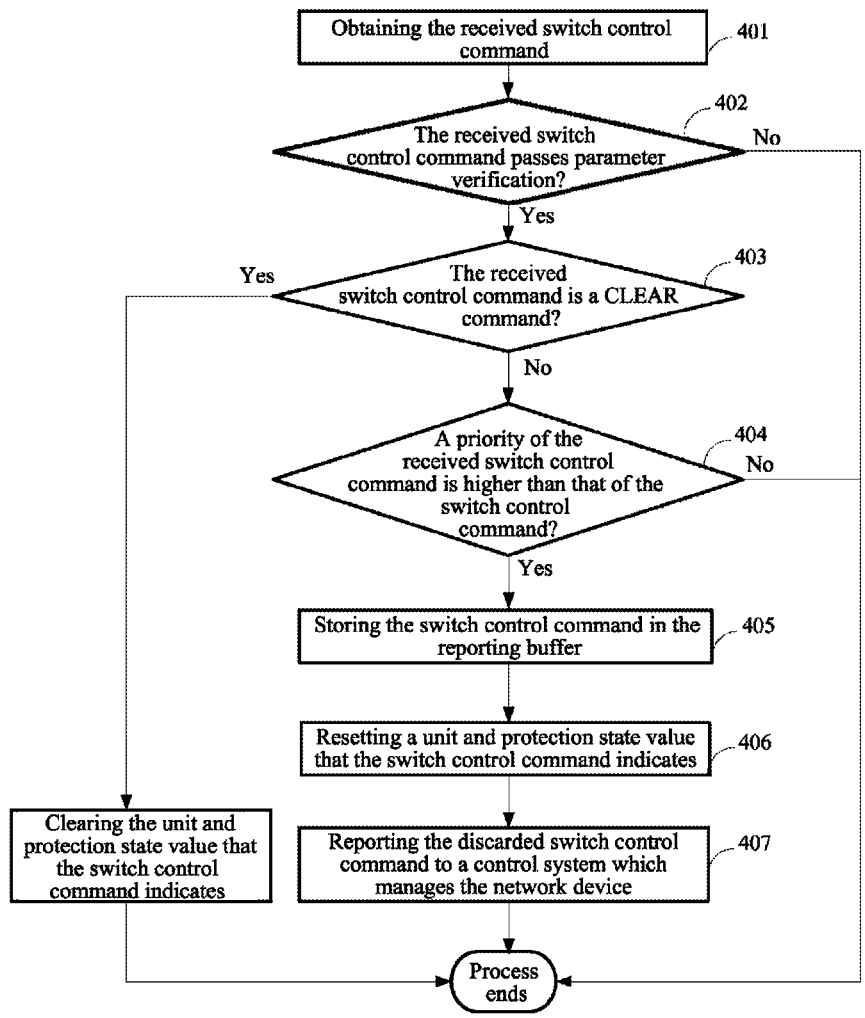
FIG. 4 is a flow chart of a method for processing a switch control command according to the third embodiment of the present invention.

In the third embodiment, trigger information is a switch control command sent by a network manager and received by a network device. The network device stores priorities of various trigger information defined by the APS protocol, and some of storage units act as reporting buffers. Referring to FIG. 4, a particular process of processing a switch control command is shown and comprises the following steps.

Step 401: the received switch control command is obtained.

Herein the received switch control command may be one of a CLEAR command, a LO command, an FS command, a MS command and an EXER command.

Step 402: parameter verification is performed on the received switch control command.

Step 403 is performed after the verification is passed, otherwise, the process ends. The parameter verification comprises whether the sent switch control command is a legal command or a command identifiable by the network device, or whether the position of the switch control command is correct, etc.

Step 403: it is determined whether the received switch control command is a CLEAR command, and if yes, a unit and protection state value that the switch control command indicates is cleared; otherwise, step 404 is performed.

Step 404: a priority of the received switch control command is compared with that of the switch control command. When the priority of the received switch control command is higher than that of the switch control command, step 405 is performed; otherwise, the process ends.

Herein there are a number of cases, for example, which will be described below.

1. If the received switch control command is a protection LO command, when the switch control command is the EXER or working FS or MS, step 405 is performed, otherwise, the process ends.

2. If the received switch control command is a protection FS command, when the switch control command is the protection LO, setting failure will be returned and the process ends; when the switch control command is the EXER or working FS or MS, step 405 is performed.

3. If the received switch control command is a working FS command, when the switch control command is the protection LO, or FS of a working position with the higher priority, or LO set in the same working position, setting failure will be returned and the process ends; when the switch control command is the EXER, or the FS or MS of other working units, step 405 is performed.

4. If the received switch control command is a protection MS command, when the switch control command is the FS or protection LO, setting failure will be returned and the process ends. When the switch control command is the EXER or working MS, step 405 is performed.

5. If the received switch control command is a working MS command, when the switch control command is the FS or protection LO, or MS of a working position with the higher priority, or LO set in the same working position, setting failure will be returned and the process ends. When the switch control command is the EXER or MS of other working units, step 405 is performed.

6. If the received switch control command is an EXER command, when the switch control command is the FS, or MS, or protection LO, setting failure will be returned and the process ends, otherwise, step 405 is performed.

Step 405: the switch control command is stored in a reporting buffer.

For the first or second case in the above step 404, the EXER or working FS or MS is stored in the reporting buffer.

For the third case in the above step 404, the EXER or FS of other working units or MS is stored in the reporting buffer.

For the fourth case in the above step 404, the EXER or working MS is stored in the reporting buffer.

For the fifth case in the above step 404, the EXER or MS of other working units is stored in the reporting buffer.

Step 406: a unit and protection state value that the switch control command indicates are reset.

For the first case in the above step 404, the unit and protection state value that the switch control command indicates is reset to be the protection and the state is reset to be the LO.

For the second case in the above step 404, the unit and protection state value that the switch control command indicates is reset to be the protection and the state is reset to be the FS.

For the third case in the above step 404, the unit and protection state value that the switch control command indicates is reset to be the working and the state is reset to be the FS.

For the fourth case in the above step 404, the unit and protection state value that the switch control command indicates is reset to be the protection and the state is reset to be the MS.

For the fifth case in the above step 404, the unit and protection state value that the switch control command indicates is reset to be the working and the state is reset to be the MS.

For the sixth case in the above step 404, the state of the switch control command is reset to be the EXER.

Step 407: contents in the reporting buffer are reported to a control system which manages the network device.

Figure 5:
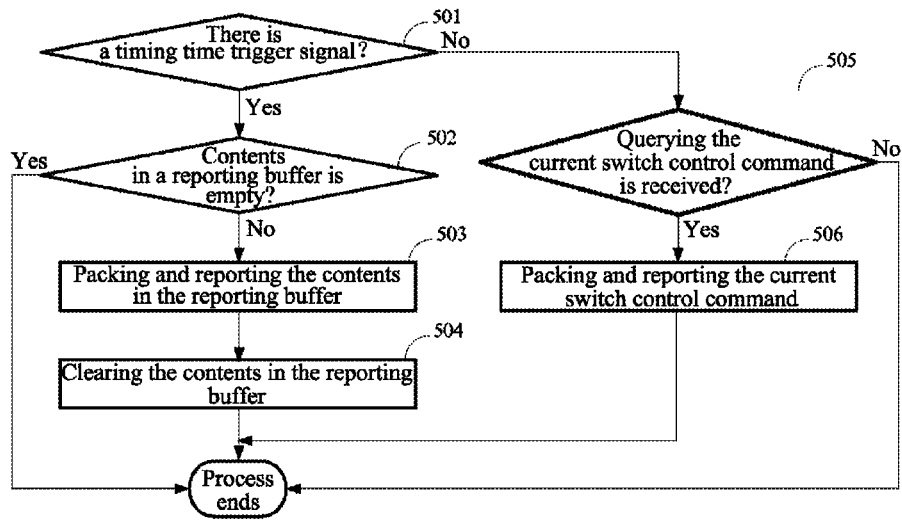
FIG. 5 is a flow chart of reporting according to an embodiment of the present invention.

In the above three embodiments, the contents in the reporting buffer can be reported to the control system which manages the network device in a way of periodically querying. The network device sets and starts a periodically-reporting timer. Timing time may be a set value, such as 1 second, 10 seconds, etc. Referring to FIG. 5, a processing flow of every timing reporting will be described below.

Step 501: it is determined whether there is a timing time trigger signal, and if yes, step 502 is performed, otherwise, step 505 is performed.

When the set time of the periodically-reporting timer has come, it will send a timing time trigger signal, namely, the periodically-reporting timer will send a timing time trigger signal periodically. Whenever there is one timing time trigger signal, step 502 is performed, otherwise, step 505 is performed.

Step 502: whether contents in the reporting buffer are empty is queried, and if there is no content in the reporting buffer, the process ends, otherwise, step 503 is performed.

Step 503: the contents in the reporting buffer are packed, and the packed contents are reported to a control system which manages the network device.

The network device reports the packed contents to a network manager or a network element control unit via a communication interface.

Step 504: the contents in the reporting buffer are cleared, and the process ends.

Step 505: it is determined whether querying the current switch control command is received, and if yes, step 506 is performed, otherwise, the process ends.

Step 506: the current switch control command is packed and reported, and the process ends.

Figure 6:
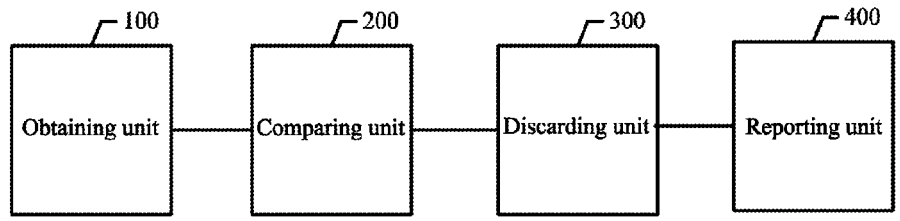
FIG. 6 is a block diagram of a apparatus for processing a switch control command according to an embodiment of the present invention.

A apparatus for processing a switch control command may be constructed according to the above-described method for processing a switch control command. The apparatus may be a function module in a network device, such as a protocol module, or may be a separate physical module. Referring to FIG. 6, the apparatus for processing the switch control command comprises an obtaining unit 100, a comparing unit 200, a discarding unit 300 and a reporting unit 400.

The obtaining unit 100 is configured to obtain trigger information.

The comparing unit 200 is configured to compare a priority of the obtained trigger information with that of a switch control command.

The discarding unit 300 is configured to discard the switch control command.

The reporting unit 400 is configured to report the discarded switch control command to a control system which manages the network device.

Thus, when the obtaining unit 100 obtains alert information or receives remote APS information, the discarding unit 300 comprises a clearing sub-unit configured to clear a unit and protection state value that the switch control command indicates.

When the obtaining unit 100 receives the remote APS information, the apparatus may further comprise a verifying unit configured to verify legality of the received remote APS information.

When the obtaining unit 100 receives the switch control command sent by a network manager, the discarding unit 300 comprises a resetting sub-unit configured to reset the unit and protection state value that the switch control command indicates based on the sent switch control command.

Of course, in the embodiment of the present invention, the discarding unit 300 may further comprise a storage sub-unit configured to store the switch control command in a reporting buffer.

Thus, the reporting unit 400 comprises a query sub-unit and a packing and reporting sub-unit.

The query sub-unit is configured to query periodically whether there is the switch control command in the reporting buffer.

The packing and reporting sub-unit is configured to pack discarding information of the switch control command when there is the switch control command in the reporting buffer and report the information to a control system which manages the network device via a communication interface.

In sum, in the embodiments of the present invention, priorities of various trigger information defined by the APS protocol are stored in a network device of an optical network. Thus, when the priority of the obtained trigger information is higher than that of the switch control command, the switch control command will be discarded, and the discarded switch control command will be reported to a control system which manages the network device. Therefore, the switch control command required to be discarded which is set on the network device is reported to the control system which manages the network device in real-time. Hereby, the control system can automatically delete a corresponding command existing in a network device interface, while a user needs not to manually perform a query on the network device, thereby enhancing the data consistency between the network device and the control system which manages the network device, improving the usability of the control system, and also providing a means of ensuring the data correctness by a query of the user.

The technical scheme of the present invention is also suitable for networks, such as the Ethernet, TMPLS network, etc.

Obviously, various modifications and variations may be made to the present invention by those skilled in the art without departing from the spirit or scope of the present invention. Thus, if such modifications and variations to the present invention belong to the scope of the claims of the present invention and its equivalent techniques, the present invention is intended to include these modifications and variations.

What is claimed is:

1. A method for processing a switch control command comprising:
   discarding a switch control command when a priority of obtained trigger information is higher than that of the switch control command, and storing discarding information of the switch control command into a reporting buffer;
   querying periodically whether there is the discarding information of the switch control command in the reporting buffer; and
   when there is discarding information of the switch control command in the reporting buffer, packing the discarding information of the switch control command and reporting the discarding information to a control system which manages a network device via a communication interface.

2. The method according to claim 1, wherein the obtained trigger information is obtained alert information or received remote Automatic Protection Switching (APS) information.

3. The method according to claim 2, wherein when the obtained trigger information is the received remote APS information, the method further comprising:
   verifying legality of the received remote APS information.

4. An apparatus for processing a switch control command comprising at least one processor for executing instructions, wherein the at least one processor and instructions cause the apparatus to:
   obtain trigger information;
   comparing a priority of the obtained trigger information with that of a switch control command;
   discard the switch control command;
   store discarding information of the switch control command into a reporting buffer;
   query periodically whether there is the discarding information of the switch control command in the reporting buffer; and
   when there is the discarding information of the switch control command in the reporting buffer, pack the discarding information of the switch control command and report the discarding information to a control system which manages a network device via a communication interface.

5. The apparatus according to claim 4, wherein the obtained trigger information is obtained alert information or received remote Automatic Protection Switching (APS) information.

6. The apparatus according to claim 5, wherein the at least one processor and instructions further cause the apparatus to:
   verify legality of the received remote APS information.

* * * * *

UNITED STATES PATENT AND TRADEMARK OFFICE
CERTIFICATE OF CORRECTION

PATENT NO.      : 8,665,867 B2                                              Page 1 of 1
APPLICATION NO. : 13/375663
DATED           : March 4, 2014
INVENTOR(S)     : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 147 days.

Signed and Sealed this

Twenty-ninth Day of September, 2015

Michelle K. Lee
*Director of the United States Patent and Trademark Office*